United States Patent
Borah et al.

[11] Patent Number: 5,961,736
[45] Date of Patent: *Oct. 5, 1999

[54] METHOD FOR REMOVAL OF CONTAMINANTS FROM SURFACES

[75] Inventors: Ronald E. Borah, Chesterton, Ind.; Michael W. Bonem, Houston, Tex.

[73] Assignee: Active Environmental Technologies, Inc., Mount Holly, N.J.

[ * ] Notice: This patent is subject to a terminal disclaimer.

[21] Appl. No.: 08/861,972

[22] Filed: May 22, 1997

Related U.S. Application Data

[63] Continuation-in-part of application No. 08/711,397, Sep. 6, 1996, Pat. No. 5,728,660, which is a continuation of application No. 08/222,469, Apr. 4, 1994, abandoned, which is a continuation-in-part of application No. 08/043,435, Apr. 5, 1993, Pat. No. 5,421,906.

[51] Int. Cl.$^6$ .............................. B08B 3/08; C11D 7/08; C23G 1/02
[52] U.S. Cl. .................. 134/26; 134/3; 134/28; 134/41; 252/142; 252/174.6; 252/546
[58] Field of Search ................ 510/110, 499, 510/506; 134/3, 26, 28, 41, 22.14; 252/142, 174.16, 174.19, 546, 548

[56] References Cited

U.S. PATENT DOCUMENTS

| | | |
|---|---|---|
| 2,148,006 | 2/1939 | Arveson . |
| 3,367,878 | 2/1968 | Mankowich . |
| 3,437,521 | 4/1969 | Buist . |
| 3,832,234 | 8/1974 | Otrhalek et al. . |
| 3,957,529 | 5/1976 | Alexander et al. . |
| 4,032,466 | 6/1977 | Otrhalek et al. . |
| 4,040,866 | 8/1977 | Mondshine . |
| 4,174,290 | 11/1979 | Leveskis . |
| 4,247,408 | 1/1981 | Imamura et al. . |
| 4,376,069 | 3/1983 | Maggi . |
| 4,390,465 | 6/1983 | Spekman, Jr. . |

(List continued on next page.)

OTHER PUBLICATIONS

Rosen, M.J., *Surfactants and Interfacial Phenomena*, Second Edition, John Wiley & Sons, Inc. (1989).
Corbitt, R.A., *Standard Handbook of Environmental Engineering*, McGraw–Hill (1990).
Manahan, S.E., *Environmental Chemistry*, Fifth Edition, Lewis Publishers, Inc. (1991).
"Boiler Water Systems", *The Nalco Water Handbook*. No date available.
*Basic Chemistry*, Chapter 11 "Emulsion Breaking". No date available.
Adamson, A.W., *Physical Chemistry of Surfaces*, Fifth Edition, John Wiley & Sons, Inc. (1990).
Haliburton Energy Institute document. pp. 8–64.
Conner, J.R., *Chemical Fixation and Solidification of Hazardous Wastes*, Van Nostrand Reinhold (1990).
Environmental Technologies Group "The Extraction of Contaminants from Porous Surfaces". No date available.

*Primary Examiner*—Krisanne Thornton
*Attorney, Agent, or Firm*—Christensen O'Connor Johnson & Kindness PLLC

[57] ABSTRACT

Cleaning processes and water-based cleaning compositions effective for the removal of radionuclides, polychlorinated biphenyls, pesticides, herbicides, and heavy metals from surfaces of all types, more especially porous surfaces, surfaces that contain irregularities and microscopic voids into which contaminants may migrate and lodge thereby creating a substrate below the surface that must also be cleaned, and particulate surfaces. The cleaning blends and processes remove contaminants from porous and irregular surfaces to such a depth below the surface and into the substrate, and to such an extent, that the cleaned surface satisfies current regulations promulgated by the EPA and NRC relating to standards for decontamination.

27 Claims, 3 Drawing Sheets

U.S. PATENT DOCUMENTS

| | | | |
|---|---|---|---|
| 4,410,396 | 10/1983 | Somers et al. .......................... 156/664 | |
| 4,430,128 | 2/1984 | Frenier et al. . | |
| 4,439,339 | 3/1984 | Doumit . | |
| 4,472,205 | 9/1984 | Cortner . | |
| 4,541,945 | 9/1985 | Anderson et al. . | |
| 4,608,086 | 8/1986 | Dodge . | |
| 4,640,719 | 2/1987 | Hayes et al. . | |
| 4,666,528 | 5/1987 | Arrington et al. . | |
| 4,749,508 | 6/1988 | Cockrell, Jr. et al. . | |
| 4,762,638 | 8/1988 | Dollman et al. . | |
| 4,792,413 | 12/1988 | Nash et al. . | |
| 4,828,743 | 5/1989 | Rahfield et al. . | |
| 4,877,459 | 10/1989 | Cockrell, Jr. et al. . | |
| 5,102,573 | 4/1992 | Han et al. . | |
| 5,122,194 | 6/1992 | Miller et al. . | |
| 5,244,539 | 9/1993 | McGrath et al. . | |
| 5,421,906 | 6/1995 | Borah ....................................... 134/26 | |
| 5,434,331 | 7/1995 | Barkatt et al. .............................. 588/1 | |
| 5,512,202 | 4/1996 | Borah . | |
| 5,723,422 | 3/1998 | O'Dell et al. ........................... 510/166 | |

METHOD FOR REMOVAL OF CONTAMINANTS FROM SURFACES

This application is a continuation-in-part of U.S. Ser. No. 08/711,397, filed Sep. 6, 1996 now U.S. Pat. No. 5,728,660, which is a continuation of application Ser. No. 08/222,469, filed Apr. 4, 1994, now abandoned, which is a continuation-in-part of application Ser. No. 08/043,435, filed Apr. 5, 1993, now U.S. Pat. No. 5,421,906.

FIELD OF THE INVENTION

The invention is of a cleaning process and cleaning compositions effective for the extraction of contaminants including radionuclides, herbicides, pesticides, polychlorinated biphenyls (PCBs), and heavy metals from interior and exterior surfaces, including the underlying substrate of such surfaces, and is most effective in cleaning difficult to clean surfaces such as porous surfaces, and irregular surfaces into which the contaminants may migrate and lodge, and surfaces of particulates. Cleaning is effected to such a depth below the surface and into the substrate and to such an extent that the cleaned surfaces do not pose an environmental or health hazard and meet current regulations promulgated by the Environmental Protection Agency (EPA) and Nuclear Regulatory Agency (NRC) relating to standards for decontamination.

DESCRIPTION OF THE RELATED ART

With the growth of industry, a significant amount of hazardous waste products and products formerly regarded as useful but now recognized as hazardous have entered the environment. These hazardous materials are frequently present as contaminants on surfaces of equipment, installations of all kinds, civil works, soil, and the like.

For example, a significant amount of radioactive waste, in the form of radionuclides, is present in nuclear power plants, nuclear weapons production plants, mining and milling equipment used for uranium mining, and in apparatus in the medical area where radioactive isotopes are used. The presence of these radionuclides, which contaminate equipment including pumps, pipelines, valves, concrete foundations, and all other equipment and structures with which the radionuclides have come into contact, now pose a serious health problem since their radioactivity is known to be carcinogenic. To qualify as a decontaminated facility, depending upon the type of radioactivity, the NRC requires that the level of radioactivity from radionuclides be reduced to less than 5,000 disintegrations per minute (DPM) in some cases and other lower levels in other cases.

Polychlorinated biphenyls (PCBs) were once widely used industrial chemicals, especially as insulating or hydraulic fluids in electrical capacitors, transformers, vacuum pumps, gas-transmission turbines, machinery, and various other devices and products. Their chemical stability and non-flammability contributed to their commercial usefulness. However, it has since been found that PCBs are carcinogens and the United States Environmental Protection Agency (EPA) currently lists PCBs and any surfaces or equipment containing PCBs as hazardous. Consequently, these chemicals are no longer recommended or used in new applications. However, a large amount of existing capital equipment, installed before the listing of PCBs as hazardous, contains PCBs. These installations pose a hazard whenever a spillage of PCBs occurs thereby contaminating the surrounding area or whenever routine repairs expose workers or the environment to PCBs.

While it is desirable to remove PCBs and dispose of these in a suitable hazardous waste facility, PCBs are not easily removed from apparatus or spilled areas because of their capability to enter into the tiniest of pores and microscopic voids and spaces in surfaces with which they come into contact. For example, in transformers which frequently contain wood, paper, metal joints, and electrical components with minute crevices, the PCBs soak into pores and microscopic voids in the steel and concrete and fill the tiniest of microscopic spaces such as pores and microscopic voids, and the like, in metals. When PCBs have spilled onto a surface, such as a concrete surface, the PCBs over time will soak into pores and microscopic voids in the concrete and contaminate the concrete to well below the exposed surface and into the underlying substrate. Current techniques that merely clean the surface of concrete that has been exposed to the PCBs for a long period of time are not able to adequately clean the surface and do not reach PCBs held in the substrate below the surface in the pores and microscopic voids. Moreover, once surface cleaning has been completed, PCBs leach from the pores and microscopic voids to the surface over time due to the effect of a concentration gradient. Thus, the surface becomes recontaminated and further cleaning is necessitated. Likewise, while the bulk of the PCBs can be readily drained from some PCB-containing equipment, the residual PCB contaminant in pores, microscopic voids, crevices, and joints is not easily removed. It is found that upon refilling the drained apparatus with a replacement fluid for PCBs, PCBs will continue to leach from surfaces of the apparatus into the replacement fluid thereby contaminating it and rendering it hazardous.

Likewise, heavy metals have been identified as hazardous to human health and the EPA requires their removal from environments where they pose a health hazard. Like PCBs and radionuclides, heavy metals have the capability to migrate into pores, joints, crevices, and microscopic voids in interior and exterior surfaces and thereby cause contamination in the substrate to well below the apparent surface of any apparatus, device, or ground surface with which they come into contact. Mere surface cleaning is therefore ineffective to remove heavy metals contamination from substrates.

Certain pesticides and herbicides are also now known to be hazardous to human health. These compositions contaminate surfaces and substrates, such as concrete, but more especially particulate surfaces, such as soil, clay, gravel, and the like.

There is a need for methods and cleaning compositions for the removal of contaminants including radionuclides, PCBs, herbicides, pesticides, and heavy metals from porous and non-porous interior and exterior surfaces, particulate surfaces, and surfaces having minute spaces, crevices, pores, or microscopic voids into which these contaminants migrate and from which they are not readily extractable. Further, the method and cleaning compositions should desirably not only extract these contaminants from well below the surface to be cleaned, but should extract these to such a level that any remaining contaminants do not pose a hazard, i.e., a surface and its underlying substrate cleaned of PCBs would meet EPA regulations for reclassification from a hazardous to a non-hazardous material; a surface and its substrate cleaned of heavy metals, herbicides, or pesticides, would meet the EPA's TCLP standard setting the upper limit for their concentration; and a surface and its substrate cleaned of radionuclides would test at less than 5,000 DPM. The method and cleaning compositions should also desirably extract these contaminants without significant surface damage or scarring. Further, the method and cleaning compositions should desirably extract these contaminants with a minimum amount of hazardous waste byproduct which must be disposed of and, in the case of radionuclides, the byproduct waste should preferably be water soluble to assist in ease of disposal. Finally, cleaning compositions should desirably not be flammable.

SUMMARY OF THE INVENTION

The invention provides water-based, cleaning compositions and methods for applying these compositions for the extraction of contaminants such as radionuclides, herbicides, pesticides, polychlorinated biphenyls (PCBs), heavy metals, and other hazardous compositions including those listed as hazardous under the U.S. EPA's TCLP standard, or mixtures thereof, from surfaces and their underlying substrates, of all kinds. While the invention cleans smooth surfaces easily, it is especially useful in cleaning hard to clean surfaces and substrates, such as substrates having porous surfaces, and surfaces with irregularities or microscopic voids. The invention also cleans particulate surfaces and the particulates. While it is usually difficult, if not impossible, using prior art techniques to remove these contaminants to acceptable regulatory levels from these hard to clean surfaces, particularly where the contaminants have remained on the surface for long periods of time thereby permitting deep migration of the contaminants into the substrate, the invention cleaning compositions and processes are particularly effective for removing contaminants from these surfaces and their substrates.

Generally, "porous surfaces" include steel (including stainless steel, mild steel, and galvanized steel) cast iron, concrete, brick, wood, and the like. "Surfaces with irregularities" include surfaces that are not porous in the conventional sense but that contain minute spaces, crevices, pores, microscopic voids, numerous capillaries, surface irregularities, and restricted spaces into which the contaminants migrate and lodge and thereby create a contaminated substrate below the surface that must also be cleaned. The invention also cleans contaminants from surfaces of particulates, such as sand, clay, gravel, and the like.

The cleaning fluids and processes of the invention are effective in removing contaminants from surfaces and their substrates and providing a cleaned surface that meets the standards currently set by the U.S. EPA. The term "contaminants" as used in the specification and claims encompasses radionuclides, PCBs, herbicides, pesticides, heavy metals, including, without limitation, all those materials and compositions listed as hazardous and that have the characteristic of toxicity under 40 C.F.R §261.24 (Table 1) (Revised as of July 1992 and hereby incorporated by reference as if fully set forth herein), and like compositions, and also materials that pose an undesirable contaminant and that desirably must be reduced in concentration to an acceptable level.

The invention cleaning fluids and processes are capable of extracting contaminants from beneath porous surfaces and the substrate, without significant surface destruction. As a result, the cleaned surface is able to meet current regulatory standards for delisting. Since the process does not require the shaving, scarring, or scabbling of the surface to be cleaned as in prior art techniques, the surface is not substantially damaged or scarred. This is particularly advantageous in the cleaning of contaminated structural equipment, supporting foundations, or equipment to be reused.

In one embodiment, the invention process requires at least two stages, while two other embodiments each have three stages. In the two-stage process a first low pH oxidation preflush stage is employed, followed by a low pH reduction precleaning stage to solubilize and remove contaminants. In one of the two three-stage processes, the low pH reduction precleaning stage is followed by a high pH extraction stage for further removal of the contaminants from the surface. When oil or grease is present on the surface, an alternative three-stage process can be employed in which the order of the process steps is modified such that the high pH extraction stage is first used, followed by the low pH oxidation preflush stage and, finally, the low pH reduction precleaning stage.

In all of the above three processes, an optional rinse step can be employed after the low pH reduction precleaning step, and another optional rinse step can be employed after the high pH extraction stage, if present.

Each stage of the above three processes is preferably performed in a container in which the surface to be cleaned is immersed in the fluid for a predetermined time at a predetermined temperature during each stage of the process. Preferably, the predetermined time is from about 5 minutes to about 24 hours and most preferably about 15 minutes. Preferably, the predetermined temperature is from about 60° F. to about 150° F., and most preferably about 140° F. Preferably, each of the baths are agitated by, for example, pumps, mechanical stirrers, steam or air sparging, or ultrasonic devices. Preferably, the concentration of the chemical constituents in the bath, are between about 10 wt. % and 100 wt. %, and most preferably, about 20 wt. %.

Optionally, after cleaning treatment, chemicals may be applied to the surface to encapsulate or seal the surface. Such chemicals include, for example, the liquid silicates. Optionally, this may be followed by applying a synthetic polymeric composition to form an impermeable barrier over the surface. Such coatings are produced, for example, by applying liquid polyurethane solutions by spraying or brushing onto the surface to be coated and sealed.

The preflush, precleaning and extraction blends are water-based (aqueous). To avoid interference from ions normally present in typical water supplies, it is preferred that the water used in making the preflush, precleaning, and extraction blends be distilled, deionized, or demineralized in order to remove or significantly reduce the ion content of the water.

In its most basic but useful form, the low pH oxidation preflush solution comprises a strong oxidizing acid dissolved in deionized water. Thus, the solution includes about 2% to about 20 wt. % nitric acid (58%) dissolved in deionized water. This solution is also useful as a rinse solution.

In a preferred composition of the low pH oxidation preflush solution, the solution contains a strong oxidizing agent, and a phosphate acid ester dissolved in distilled water. A most preferred formulation of the low pH oxidation preflush solution includes about 20 wt. % nitric acid (58%), about 10 wt. % of a phosphate acid ester and distilled water or substantially ion-free. Optionally, about 0.5 wt. % to about 9 wt. % hydrogen peroxide can be added.

Typically, the low pH reduction precleaning fluid comprises from about 0.4 to about 10 wt. % sulfamic acid, from about 0.5 to about 10 wt. % ammonium bifluoride, from about 0.2 to about 6wt. %, 35% hydrochloric acid, about 0.1 to about 4 wt. % of a non-ionic surfactant, about 0.8 to about 14 wt. % sodium citrate or citric acid, about 0.1 to about 6 wt. % phosphate acid ester; about 0.1 to about 20 wt. % triethanolamine, optionally, about 0.1 to about 2 wt. % d-limonine, and optionally, about 0.1 wt. % to about 5 wt. % EDTA. The fluid may be prepared without triethanolamine which is used to adjust the pH.

In a preferred embodiment, the low pH reduction precleaning fluid comprises about 8 wt. % sulfamic acid, about 8 wt. % ammonium bifluoride, about 5 wt. %, 35% hydrochloric acid, about 1 wt. % non-ionic surfactant, about 12 wt. % sodium citrate or citric acid, about 2 to about 7 wt. % oxalic acid (more preferably 5 wt. %), up to about 10 wt. % triethanolamine, about 4 wt. % phosphate acid ester, and optionally, about 1 wt. % d-limonine.

In a most preferred embodiment, the low pH reduction precleaning fluid includes: less than about 1 wt. % formic acid (85% strength), about 0.4 to about 10 wt. % sulfamic acid, about 0.4 to about 10 wt. % ammonium bifluoride (38% strength), about 0.1 to about 6 wt. % of a phosphate acid ester, about 0.6 to about 15 wt. % citric acid present as sodium citrate, about 0.1 to about 7 wt. % oxalic acid, about 0.1 to about 5 wt. % glycolic acid (also known as hydroxyacetic acid), about 0.1 to about 5 wt. % d-limonine as an optional deodorizer, about 0.2 to about 6 wt. % hydrochloric acid (35% strength), about 0.1 to about 20 wt. % triethanolamine (used to adjust the pH), about 0.1 to about 4 wt. % of a non-ionic surfactant (6-8 molar concentration), and distilled water.

Preferably, the high pH extraction fluid includes from about 0.5 to about 8 wt. % of a surfactant that is preferably amphoteric or non-ionic, and is most preferably amphoteric; from about 0.4 to about 9 wt. % of an emulsifier, preferably an emulsifier containing quaternary amines, isopropyl alcohol, and glycerin; about 0.1 to about 20 wt. % ethylene diamine tetracetic acid; about 0.5 to about 12 wt. % ethylene glycol monobutyl ether; about 0.3 to about 8 wt. % of a hydrotropic agent; and about 0.3 to about 8 wt. % triethanolamine.

In a most preferred embodiment, the high pH extraction fluid is formulated as follows: about 0.5 to about 8 wt. % of a surfactant, about 0.1 to about 5 wt. % of a phosphate acid ester, about 0.4 to about 9 wt. % of an emulsifier, about 0.15 to about 20 wt. % EDTA (VERSENE-100 of Dow Chemical), about 0.4 to about 15 wt. % of a composition selected from the group consisting of nitrolotriacetic acid, gluconic acid, CDTA, EBTA, and HEDTA (VERSENOL-120 of Dow Chemical); about 0.5 to about 12 wt. % ethylene glycol monobutyl ether, about 0.4 to about 8 wt. % triethanolamine, about 0.1 to about 5 wt. % propylene glycol, about 0.1 to about 5 wt. % triethylamine, about 0.1 to about 10 wt. % kerosene (deodorized), about 0.1 to about 5 wt. % trimethylamine, and distilled water. In order to assist hydrotropic agent formation, additional phosphate acid ester may be added at the end of the process of blending the fluid. In order to increase the pH to greater than about 11.5, potassium hydroxide is added. d-limonine may be added optionally for odor control.

When a rinse step is employed, a rinse solution of water substantially free of polyvalent cations can be used. Alternatively, a preferred rinsing solution of about 4 wt. % to about 8 wt. % sodium citrate in distilled water or other water substantially free of ions can be employed. A more preferred rinsing solution includes about 20 wt. % nitric acid (about 58% strength) and a non-ionic surfactant in deionized water. Most preferably, the nitric acid rinse includes about 10 wt. % of a phosphate acid ester.

The cleaning compositions utilized are not flammable and the waste generated during cleaning generally constitutes less than about 7–8 gallons/100 ft$^2$ of surface cleaned. Therefore, waste disposal costs are minimized.

The cleaning process and cleaning compositions of the invention can reduce PCB contamination to less than 10 micrograms per 100 square centimeters (10 $\mu$g/100 cm$^2$) of treated surface or "non-detectable," i.e., 0.2 $\mu$g/100 cm$^2$, so that the cleaned apparatus, structure, or other previously contaminated surface, may be reclassified under EPA regulations from a hazardous material to a non-hazardous material. Similarly, heavy metals are removed to a surface concentration of less than current EPA TCLP regulatory levels (40 C.F.R. §261.24, as revised Jul. 1, 1992) for each of the listed heavy metals; and radionuclides can be reduced to surface concentrations of less than about 2,000 DPM (disintegrations per minute), less than about 200 DPM in some cases, or to background levels, in other cases. Herbicide and pesticide levels are reduced to a surface concentration of less than current EPA TCLP regulatory levels for each of the listed herbicides and pesticides.

As a result of the low level of residual surface contamination after application of the process of the invention and the deep cleaning, to a significant depth below the surface and into its substrate, the cleaned equipment, particulates, or structures may be reclassified (under current federal regulations) as a non-hazardous substance, or disposed of as non-hazardous, or reclassified for reuse or resale.

DETAILED DESCRIPTION OF THE PREFERRED EMBODIMENTS

Overview

Figure 1:
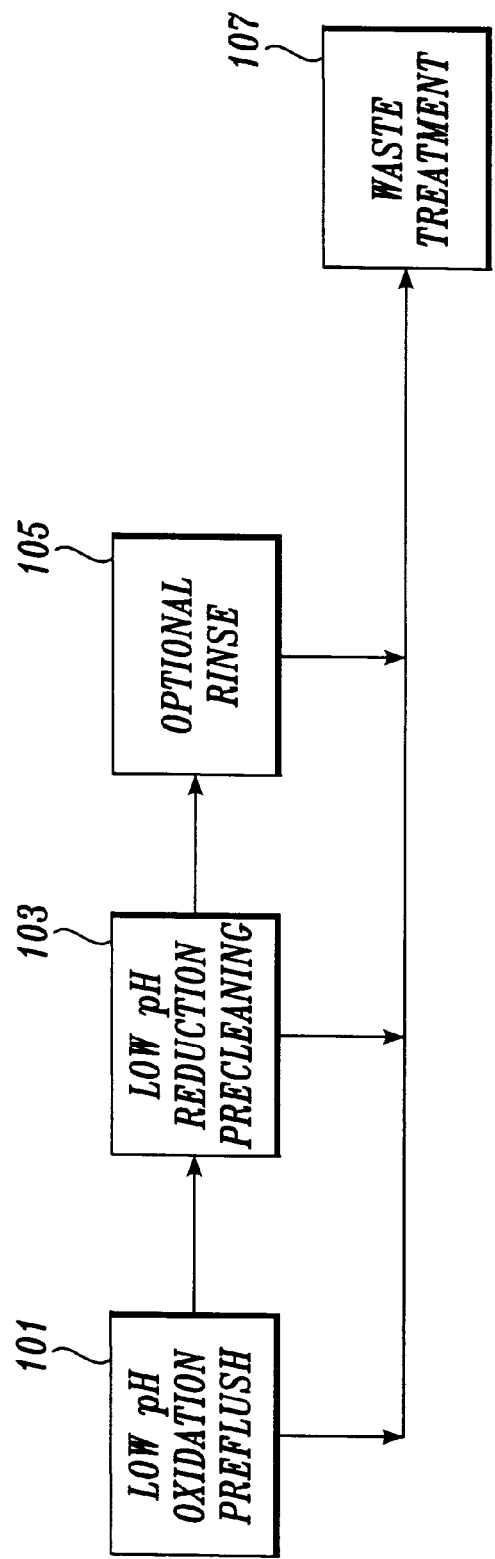
FIG. 1 is a block diagram of a first embodiment of the surface cleaning process of the present invention.

The invention provides a cleaning process and cleaning fluid blends for removing contaminants such as, for example, radionuclides, herbicides, pesticides, PCBs, and heavy metals from interior and exterior surfaces of all types, including the substrates of such surfaces. The invention is particularly effective for removing contaminants from porous surfaces and surfaces that are conventionally regarded as non-porous but that may contain minute spaces, crevices, pores, microscopic voids, or other surface irregularities and restricted spaces into which these contaminants migrate and lodge and thereby create a substrate below the surface that must also be cleaned. For simplicity, these latter "conventionally non-porous" surfaces are hereinafter referred to as "surfaces with irregularities" or "surface irregularities." The invention removes the contaminants from porous materials and surfaces with irregularities to a significant depth beneath the surface so that current regulatory standards for decontamination are substantially achieved. Thereafter, the surfaces may be sealed with liquid silicates and then with a coating of a synthetic polymeric composition, such as with a polyurethane coating in order to retard subsequent migration of the contaminants. The invention process and cleaning fluids can also be used to remove contaminants from particulates such as sand, clay, gravel, and the like.

It has been found that roughening the contaminated surface before the application of chemical treating fluids results in an increased penetration of the fluids into the surface thereby facilitating cleaning. In general, the surface roughening may be carried out by roughening with sand paper, steel wool, or other abrasive that will operate upon the surface to produce sufficient roughening to aid penetration of fluids into the surface.

The invention process and cleaning fluids can decontaminate radionuclide contaminated materials to less than the NRC-required 5,000 DPM (disintegrations per minute) standard. Heavy metals-contaminated materials and herbicide or pesticide-contaminated materials can be cleaned to meet or better the EPA's current TCLP standards. The invention process and cleaning fluids can also produce surfaces decontaminated of PCBs that meet current EPA standards: less than 10 micrograms/100 $cm^2$ to allow reclassification from a hazardous material to a non-hazardous material; and 0.2 micrograms/100 $cm^2$ to allow reuse or resale of PCB-decontaminated articles.

The invention cleaning blends are water-based (aqueous) and, to prevent interference from ions normally present in a typical water supply, it is preferred that the water be distilled, deionized, or demineralized to remove interfering ions and provide substantially ion-free water. As a precaution, it is also recommended that any rinsing or washing with water should likewise be carried out with water that is substantially ion-free.

While not wishing to be bound by any theory, it is hypothesized that the invention process and cleaning compositions may perform their function by interaction of basic electrochemical processes. Contaminants migrate into the surface and penetrate the substrate to electrostatically bond to it. Contaminated surfaces are usually negatively charged. Therefore, the positive ion-containing cleaning solutions are attracted to the surface by electrostatic effects and attracted into pores and microscopic voids and crevices by both electrochemical effects and electrocapillary forces. Further, the cations in the extraction solutions react electrochemically with contaminants to solubilize, or leach out the contaminants.

When the contaminant to be removed is heavy metals, the invention can remove up to about 90% of the contamination from a surface in a first application of the process steps. Each subsequent application of the invention process continues to remove up to about 90% of the then remaining contamination from the surface. Similarly, a first application of the invention method and fluids can result in a reduction of from about 70% to about 90% of the total radionuclide count. Each subsequent application of the invention process can continue to remove up to 70% to 90% of the then remaining contamination from the surface. When the contaminant is a pesticide or herbicide, the process can reduce residual levels to a level that meets TCLP standards (if it is a listed composition) or levels that are deemed acceptable (if it is not listed).

When the contaminant to be removed is PCBs, then the invention method can remove up to about 90% of the contamination from a surface in a first application of the process steps. Each subsequent application of the invention process can continue to remove up to about 90% of the then remaining contaminants. Through the multiple application of the invention process, the contaminants can be reduced to less than $10 \mu g/100$ $cm^2$ (meeting the EPA's standard for reclassification as non-hazardous) or a level that is non-detectable (i.e., 0.2 $\mu g/100$ $cm^2$, or less), so that the cleaned equipment, apparatus, or other surface, meets the EPA guidelines for subsequent reuse, resale, or disposal as a non-hazardous material.

Further, the process allows the extraction of contaminants to a significant depth beneath a porous surface, such as concrete, brick, wood, and the like, without substantial surface destruction or scarring.

Once the desired level of decontamination has been achieved, any residual contaminants remaining in the substrate having a porous surface or surface with irregularities, may be sealed. This may be achieved by applying a chemical fixative such as liquid silica to the surface to encapsulate or coat the surface. Thereafter, a solution of a synthetic impermeable polymer may be applied to the surface by conventional techniques such as spraying, brushing, and the like. An especially preferred over coating is provided by applying a clear polyurethane solution to the cleaned surface.

Since the process utilizes precleaning fluid, rinsing fluids, and extraction fluids, these will become contaminated with the contaminant that is being removed from the surface. These contaminated fluids must then be disposed of in an environmentally acceptable manner. To minimize disposal costs, the quantity of these contaminated fluids should be minimized. Generally, the complete invention process requires a total of 6 gallons/100 $ft^2$ of surface cleaned, more typically, less than 7–8 gallons/100 $ft^2$. Thus, the process generates a relatively low amount of hazardous waste for disposal.

The Low pH Oxidation Preflush Solution

The low pH oxidation preflush solution according to the invention is an aqueous solution with a pH less than 2, preferably a pH of about 0.0 to about 2.0, and most preferably a pH of about 1. The low pH oxidation preflush solution facilitates the action of extraction and may be applied for example when the contaminant to be removed includes PCBs, organics, pesticides, radionuclides, or heavy metals.

In its most basic but useful form, the low pH oxidation preflush solution comprises a strong oxidizing acid dissolved in deionized water. Thus, the solution includes about 2% to about 20 wt. % nitric acid (58%) dissolved in deionized water. This solution is also useful as a rinse solution.

In a preferred composition of the low pH oxidation preflush solution, the solution contains a strong oxidizing agent, and a phosphate acid ester dissolved in distilled water. A most preferred formulation of the preflush solution includes about 20 wt. % nitric acid (58%), about 10 wt. % of a phosphate acid ester and distilled water or substantially ion-free water. Optionally about 0.5 wt. % to about 9 wt. % hydrogen peroxide can be added. From about 3 wt. % to about 10 wt. %, and preferably about 6 wt. % sulfuric acid can, optionally, be added.

Under certain conditions, a corrosion inhibitor may have to be added. These conditions may readily be determined by testing a portion of the surface with the low pH oxidation preflush solution. Under certain conditions, hydrogen can be generated when the solution is applied to a surface.

The Low pH Reduction Precleaning Composition

The low pH reduction precleaning composition used in the invention is an aqueous fluid comprising several chemical compositions blended into substantially ion-free water, having a pH of preferably about 2.0 to about 4.0, and most preferably about 2.5. It is preferred that substantially ion-free water be used to prevent possible interference of ions typically present in water with the ions utilized by the precleaning fluid in its cleaning action.

The low pH reduction precleaning fluid includes compositions able to extract covalent cations from contaminated surfaces; acids that are useful as degreasers, and solubilizers of heavy metals; compositions that produce a chemical, such as hydrofluoric acid, for slightly etching the surfaces to be cleaned, including silica-containing surfaces; surfactants that act as wetting agents and that facilitate the flushing of contaminants from pores, microscopic voids, crevices, and other surface irregularities; chelating agents that fix solubilized metals and particulates into chemical complexes and that also remove stains; solvent cleaners that also act as detergents and degreasers; and optionally a composition that masks odors.

Preferably, the acid for the extracting of covalent cations, such as magnesium, calcium, and sodium, is sulfamic acid. Preferably, the composition that produces hydrofluoric acids which attacks and slightly etches surfaces to be cleaned, is ammonium bifluoride. Preferably, the acid used as a degreaser is hydrochloric acid. Preferably, the surfactant is a non-ionic or amphoteric surfactant. More preferably, the surfactant is amphoteric. Preferably, the chelating agent of the precleaning fluid includes more than one chelant. Preferably one of the chelating agents is sodium citrate. More preferably, the chelating agents are sodium citrate and oxalic acid, the latter also acting as a stain remover, especially for iron oxide stains. Preferably, the solvent cleaner is triethanolamine which also acts as a water softener, dispersion agent, emulsifier, wetting agent, detergent, and degreaser. Optionally, an odor masking chemical may be added. Preferably, this odor masker is d-limonine which also acts as a degreaser. Optionally, EDTA may also be added.

Typically, the low pH reduction precleaning fluid comprises from about 0.4 to about 10 wt. % sulfamic acid, from about 0.5 to about 10 wt. % ammonium bifluoride, from about 0.2 to about 6 wt. %, 35% hydrochloric acid, about 0.1 to about 4 wt. % of a non-ionic surfactant, about 0.8 to about 14 wt. % sodium citrate or citric acid, about 1 to about 6 wt. % phosphate acid ester; about 0.1 to about 20 wt. % triethanolamine, optionally, about 0.1 to about 2 wt. % d-limonine, and optionally, about 0.1 wt. % to about 5 wt. % EDTA. The fluid may be prepared without triethanolamine which is used to adjust the pH.

In a preferred embodiment, the low pH reduction precleaning fluid comprises about 8 wt. % sulfamic acid, about 8 wt. % ammonium bifluoride, about 5 wt. %, 35% hydrochloric acid, about 1 wt. % non-ionic surfactant, about 12 wt. % sodium citrate or citric acid, about 2 to about 7 wt. % oxalic acid (more preferably 5 wt. %), up to about 10 wt. % triethanolamine, about 4 wt. % phosphate acid ester, and optionally, about 1 wt. % d-limonine.

In a most preferred embodiment, the low pH reduction precleaning fluid includes: less than about 1 wt. % formic acid (85% strength), about 0.4 to about 10 wt. % sulfamic acid, about 0.4 to about 10 wt. % ammonium bifluoride (38% strength), about 0.1 to about 6 wt. % of a phosphate acid ester, about 0.6 to about 15 wt. % citric acid present as sodium citrate, about 0.1 to about 7 wt. % oxalic acid, about 0.1 to about 5 wt. % glycolic acid (also known as hydroxyacetic acid), about 0.1 to about 5 wt. % d-limonine as an optional deodorizer, about 0.2 to about 6 wt. % hydrochloric acid (35% strength), about 0.1 to about 20 wt. % triethanolamine (used to adjust the pH), about 0.1 to about 4 wt. % of a non-ionic or amphoteric surfactant, and distilled water.

For certain applications, a corrosion inhibitor may have to be added to the low pH reduction precleaning fluids to avoid damage to the contaminated surface. The surface may readily be tested for susceptibility by treating a small portion with the precleaning blend as a test measure. Additional amounts of the phosphate acid ester may have to be added at the end of process for making the precleaning fluid in order to couple (hydrotropic agent) the composition.

The High pH Extraction Fluid

In order to clean any type of surface, including smooth surfaces, but especially those porous surfaces, surfaces of particulates, and irregular surfaces that are hard to clean because they retain contaminants in the substrate of the surface through the irregularities in the surface, the invention provides a high pH extraction fluid preferably having a pH of from about 11.5 to about 13.5, and most preferably about 12.5. This high pH extraction fluid is water-based and is preferably prepared using substantially ion-free water, such as distilled water, demineralized water, and deionized water. The use of substantially ion-free water prevents the cleaning hindering interaction of ions typically present in a water supply with ions produced from the components of the extraction fluid.

The high pH extraction fluid is a mixture of a range of components, each of which perform a function in the extraction operation. More specifically, the high pH extraction fluid includes a surfactant that is preferably amphoteric or nonionic, and is most preferably amphoteric; an emulsifier for emulsifying hydrocarbons from the contaminated surface; chelating agents for holding solubilized metal ions and particulates in suspension; degreasing agents for removing hydrocarbons from the contaminated surface; a hydrotropic agent for facilitating maintaining all ingredients in solution; and a wetting agent to facilitate wetting of the surface and pores and microscopic voids or crevices within the surface.

Preferably, the emulsifier contains quaternary amines, isopropyl alcohol, and glycerin, preferably EMULSIFIER FOUR™ of Tomah Products, although other emulsifiers are also suitable. Preferably, the chelant comprises at least two chelating agents. More preferably, these chelating agents are selected from ethylene diamine tetracetic acid (EDTA), nitrilotriacetic acid (NTA), 1,2 diamino-cyclohexanetetracetic acid (CDTA), ethylene-bis (oxyethylene nitrilo) -tetracetic acid (EBTA), hydroxyethylenediamine (HEDTA), and sodium gluconate. Preferably, the degreaser is ethylene glycol monobutyl ether, although other degreasers may also be suitable. The hydrotropic agent is preferably of a type that also provides chemical buffering action to maintain pH. A preferred wetting agent, that also serves as a solvent and degreaser is triethanolamine, although other wetting agents are also useful.

Preferably, the high pH extraction fluid includes from about 0.5 to about 8 wt. % of a non-ionic surfactant; from about 0.4 to about 9 wt. % of an emulsifier, preferably an emulsifier containing quaternary amines, isopropyl alcohol, and glycerin; about 0.1 to about 20 wt. % ethylene diamine tetracetic acid; about 0.5 to about 12 wt. % ethylene glycol monobutyl ether; about 0.3 to about 8 wt. % of a hydrotropic agent; and about 0.3 to about 8 wt. % triethanolamine.

In a most preferred embodiment, the extraction fluid is formulated as follows: about 0.5 to about 8 wt. % of a non-ionic or amphoteric surfactant, about 0.1 to about 5 wt. % of a phosphate acid ester, about 0.4 to about 9 wt. % of an emulsifier, about 0.15 to about 20 wt. % EDTA (VERSENE-100 of Dow Chemical), about 0.4 to about 15 wt. % of a composition selected from the group consisting of nitrolotriacetic acid, gluconic acid, CDTA, EBTA, and HEDTA (VERSENOL-120 of Dow Chemical); about 0.5 to about 12 wt. % ethylene glycol monobutyl ether, about 0.4 to about 8 wt. % triethanolamine, about 0.1 to about 5 wt. % propylene glycol, about 0.1 to about 5 wt. % triethylamine, about 0.1 to about 10 wt. % kerosene (deodorized), about 0.1 to about 5 wt. % trimethylamine, and distilled water. In order to assist hydrotropic agent formation, additional phosphate acid ester may be added at the end of the process of blending the fluid. In order to increase the pH to greater than about 11.5, potassium hydroxide is added. d-limonine may be added optionally for odor control.

The Optional Rinse

When a rinse step is employed, a rinse solution of water substantially free of polyvalent cations can be used. Alternatively, a preferred rinsing solution of about 4 wt. % to about 8 wt. % sodium citrate in distilled water or other water substantially free of ions can be employed. A more preferred rinsing solution includes about 20 wt. % nitric acid (about 58% strength) and a non-ionic surfactant in deionized water. Most preferably, the nitric acid rinse includes about 10 wt. % of a phosphate acid ester.

The Basic Sequence

In a first embodiment of the present invention, as shown in FIG. 1, a basic sequence for cleaning surfaces is employed. In this basic sequence, as in the enhanced sequence and the oil/grease sequence described below, the surfaces of the objects to be cleaned are sequentially immersed in a series of vessels or vats sized for the particular objects being immersed; the objects sequentially being immersed in baths for a time of preferably from about 5 minutes to about 24 hours, and most preferably about 15 minutes, and in baths of a preferred temperature of from about 60° F. to about 150° F., and most preferably about 140° F. The objects are sequentially moved from bath to bath in, for example, mesh baskets or other transport devices known in the art. The concentration of the low pH oxidation preflush solution, low pH reduction preclean solution, or high pH extraction solution in a bath is preferably from about 10 wt. % to about 100 wt. %, as reflected in the concentrations of each individual chemical component for each solution previously disclosed. Most preferably, the solution concentrations are about 20 wt. %. Preferably, while immersed in one or more of the baths, the cleaning fluid is subject to agitation by pumps, mechanical stirrers, steam or air sparging, or ultrasonic transducers to enhance cleaning of the immersed objects.

As shown in FIG. 1, the basic sequence consists of first immersing the surface of the object to be cleaned in a bath of low pH oxidation preflush solution 101 and then immersing the surface of the object in a bath of low pH reduction precleaning solution 103. Optionally, the surface of the object is placed in a bath of rinse solution 105. Also optionally, all of the solutions are fed into a liquid waste treatment station 107 for decontamination and/or disposal known in the art.

The Enhanced Sequence

Figure 2:
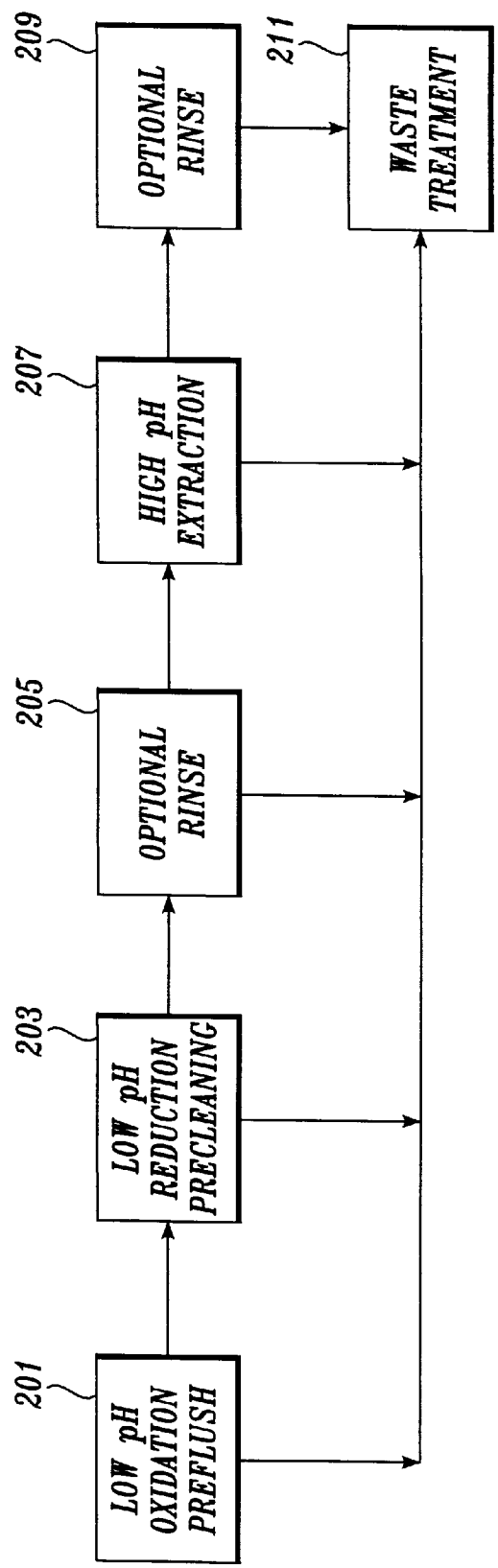
FIG. 2 is a block diagram of a second, enhanced embodiment of the surface cleaning process of the present invention.

As shown in FIG. 2, the enhanced sequence consists of first immersing the surface of the object to be cleaned in a bath of low pH oxidation preflush solution 201, next in a bath of low pH reduction precleaning solution 203, optionally next in a bath of rinse solution 205, next in a bath of high pH extraction solution 207 and, optionally, in a second bath of rinse solution 209. Also optionally, all of the solutions are fed into a liquid waste treatment station 211 known in the art for decontamination and/or disposal.

The Oil/Grease Sequence

Figure 3:
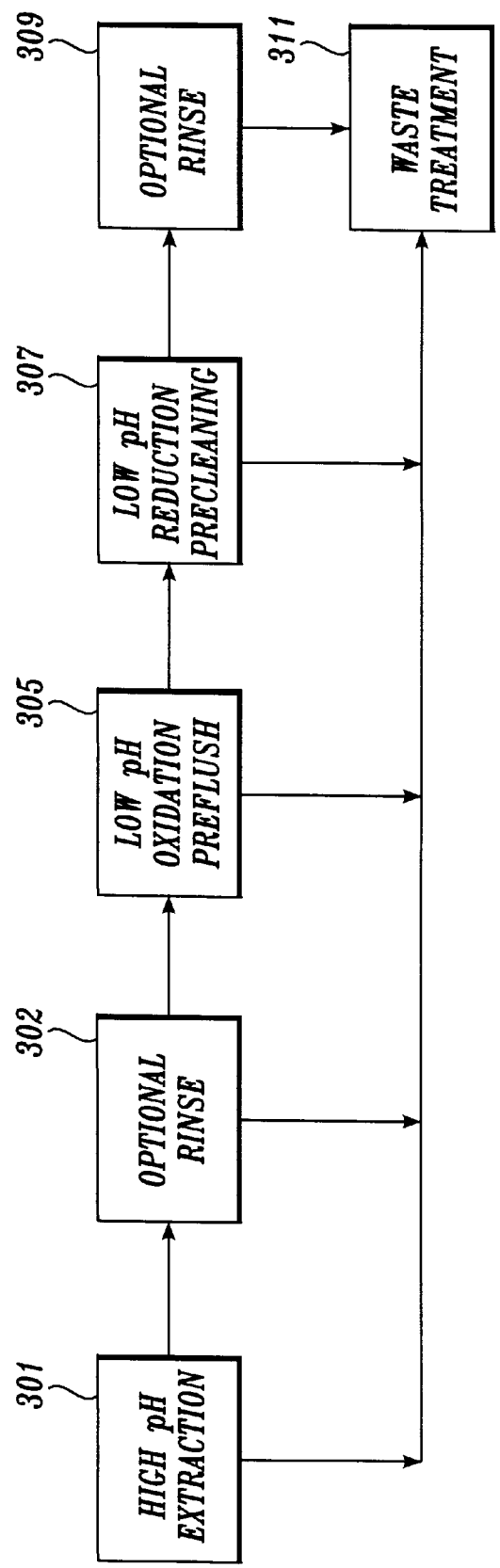
FIG. 3 is a block diagram of a third, oil and grease removal embodiment of the surface cleaning process of the present invention.

When the surface of the object to be cleaned is contaminated with oil, grease, or many other hydrophobic chemicals, the oil/grease sequence of FIG. 3 can be employed. As shown in FIG. 3, the oil/grease sequence consists of first optionally immersing the surface of the object to be cleaned in a bath of high pH extraction solution 301, next optionally in a bath of rinse solution 303 then in a bath of low pH oxidation preflush solution 305, next in a bath of low pH reduction precleaning solution 307, and then, optionally, in a second bath of rinse solution 309. Also optionally, all of the solutions are fed into a liquid waste treatment station 311 known in the art for decontamination and/or disposal.

The following examples are intended to illustrate aspects of the invention and do not in any way limit the scope of the invention as described above and claimed below.

EXAMPLE 1

A bench scale test was performed using the basic sequence of FIG. 1 in which a bath of low pH oxidation preflush solution was first used, followed by a bath of low pH reduction precleaning solution and an optional bath of rinse solution. Two and one-half gallon stainless steel tanks equipped with ultrasonic transducers (720 watt, 45 KHz) contained 1 gallon each of solutions having the following chemical constituents:

| Chemical | Weight Percent |
|---|---|
| Low pH Oxidation Preflush Solution | |
| Nitric acid | 20.0% |
| Phosphate acid ester | 10.0% |
| Hydrogen peroxide | 1.0% |
| Water (deionized) | 69.0% |
| Low pH Reduction Precleaning Solution | |
| Hydrochloric acid | 5.0% |
| Sulfamic acid | 7.5% |
| Ammonium bifluoride | 7.5% |
| Triethanolamine | 2.5% |
| Citric acid | 10.0% |
| Oxalic acid | 5.0% |
| Glycolic acid | 2.5% |
| Non-ionic surfactant | 5.0% |
| Formic acid | 1.0% |
| Phosphate acid ester | 5.0% |
| EDTA | 2.5% |
| Water (deionized) | 46.5% |
| Rinse Solution | |
| Deionized water | 90.0% |
| Low pH oxidation preflush solution | 10.0% |

Sampling needles contaminated with cesium and cobalt were sequentially placed in the tanks containing the low pH oxidation preflush solution at 110° F. for 5 minutes, low pH reduction precleaning solution at 110° F. for 15 minutes, and rinse solution at a temperature of about 100° F. for 10 minutes. The radioactive contamination of the needles was reduced from a high of about 15,000 disintegrations per minute to less than 1000 disintegrations per minute, which met Department of Energy guidelines.

EXAMPLE 2

The protocol of the enhanced sequence of FIG. 2 was employed to decontaminate lighting element manufacturing equipment contaminated with thorium whereby a bath of low pH oxidation solution was first used, then an optional bath of rinse solution, next a bath of low pH oxidation preflush solution, then a bath of low pH reduction precleaning solution, and finally a second optional bath of rinse solution. The parts were lightly scrubbed, and the solutions consisted of:

| Chemical | Weight Percent |
|---|---|
| Low pH Oxidation Preflush Solution | |
| Nitric acid | 20.0% |
| Phosphate acid ester | 10.0% |
| Hydrogen peroxide | 1.0% |

-continued

| Chemical | Weight Percent |
|---|---|
| Water (deionized) | 69.0% |
| Low pH Reduction Precleaning Solution | |
| Hydrochloric acid | 5.0% |
| Sulfamic acid | 7.5% |
| Ammonium bifluoride | 7.5% |
| Triethanolamine | 2.5% |
| Citric acid | 10.0% |
| Oxalic acid | 5.0% |
| Glycolic acid | 2.5% |
| Non-ionic surfactant | 5.0% |
| Formic acid | 1.0% |
| Phosphate acid ester | 5.0% |
| EDTA | 2.5% |
| Water (deionized) | 46.5% |
| High pH Oxidation Bxtraction Solution | |
| Water (deionized) | 38.0% |
| Emulsifier | 7.5% |
| Surfactant | 5.0% |
| Triethanolamine | 2.5% |
| 1.2 Propyleneglycol | 2.5% |
| Ethylene glycol monobutyl ether | 10.0% |
| Phosphate acid ester | 2.5% |
| d-Limonene | 1.0% |
| Triethylamine | 2.5% |
| Trimethylamine | 1.0% |
| EDTA | 10.0% |
| NTA | 5.0% |
| Gluconic acid | 2.5% |
| HEDTA | 2.5% |
| Kerosene | 7.5% |
| Rinse Solution | |
| Deionized water | 100.0% |

Thorium contaminated lighting element manufacturing equipment was sequentially placed in the tanks containing the low pH oxidation preflush solution for 10 minutes at 80° F., low pH reduction precleaning solution for 10 minutes at 80° F., rinse solution for 10 minutes at 80° F., high pH extraction solution for 10 minutes at 80° F. and second rinse solution. The radioactive contamination of the equipment was reduced from between 5,000 and 200,000 disintegrations per minute to below about 500 disintegrations per minute. Materials were lightly scrubbed in each tank.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for removing contaminants from surfaces and the substrates of such surfaces, including porous surfaces, particulate surfaces, and surfaces with irregularities into which the contaminants may migrate or lodge, the method comprising:
  immersing the surface in a low pH oxidation bath having a predetermined temperature and for a predetermined time, said low pH oxidation bath comprising about 2 weight percent to about 20 weight percent nitric acid; and
  immersing the surface in a low pH reduction bath having a predetermined temperature and for a predetermined time, said low pH reduction bath comprising about 0.4 weight percent to about 10 weight percent of an acid able to extract cations from the contaminated surface, about 0.5 weight percent to about 10 weight percent of a composition that produces hydrofluoric acid in aqueous solution, about 0.1 weight percent to about 4 weight percent of a surfactant and about 0.8 weight percent to about 14 weight percent of a chelating agent able to fix soluble metals in the contaminants.

2. The method of claim 1, further comprising:
  immersing the surface in a high pH extraction bath having a predetermined temperature and for a predetermined time, said high pH extraction bath comprising:
    about 0.5 weight percent to about 8 weight percent of a surfactant;
    about 0.4 weight percent to about 9 weight percent of a hydrocarbon emulsifier;
    about 0.1 weight percent to about 20 weight percent of a chelating agent for holding solubilized metal ions and particulates in suspension;
    about 0.5 weight percent to about 12 weight percent of a degreasing agent for removing hydrocarbons from the contaminated surface;
    about 0.3 weight percent to about 8 weight percent of a wetting agent; and
    about 0.3 weight percent to about 8 weight percent of a hydrotropic agent.

3. The method of claim 2, wherein the surface is first immersed in the low pH oxidation bath, is next immersed in the low pH reduction bath, and is then immersed in the high pH extraction bath.

4. The method of claim 3, further comprising:
  rinsing the surface after immersion in the low pH reduction bath.

5. The method of claim 3, further comprising:
  rinsing the surface after immersion in the high pH extraction bath.

6. The method of claim 2, wherein the surface is first immersed in the high pH extraction bath, is next immersed in the low pH oxidation bath, and is then immersed in the low pH reduction bath.

7. The method of claim 6, further comprising:
  rinsing the surface after immersion in the high pH extraction bath.

8. The method of claim 6, further comprising:
  rinsing the surface after immersion in the low pH reduction bath.

9. The method of claim 2, wherein the pH of the high pH extraction bath is from about 11.5 to about 13.5.

10. The method of claim 2, wherein the high pH extraction bath is subjected to agitation.

11. The method of claim 2, wherein the predetermined temperature the surface is immersed in the high pH extraction bath is from about 5 minutes to about 24 hours and the predetermined temperature of the high pH extraction bath is from about 60° F. to about 150° F.

12. The method of claim 2, wherein the high pH extraction bath comprises:
  about 0.5 weight percent to about 8 weight percent of a surfactant;
  about 0.4 weight percent to about 8 weight percent of an emulsifier;
  about 0.1 weight percent to about 20 weight percent ethylene diamine tetracetic acid;
  about 0.5 weight percent to about 12 weight percent ethylene glycol monobutyl ether;
  about 0.3 weight percent to about 8 weight percent of a hydrotropic agent; and
  about 0.3 weight percent to about 8 weight percent of triethanolamine.

13. The method of claim 2, wherein the high pH extraction bath comprises:

about 0.5 weight percent to about 8 weight percent amphoteric surfactant;

about 0.1 weight percent to about 5 weight percent phosphate acid ester;

about 0.4 weight percent to about 9 weight percent emulsifier;

about 0.15 weight percent to about 20 weight percent ethylene diamine tetracetic acid;

about 0.4 weight percent to about 15 weight percent of a composition selected from the group consisting of 1,2 diamino-cyclohexane-tetracetic acid, ethylene-bis (oxyethylene nitrilo) -tetracetic acid, and hydroxyethylenediamine;

about 0.5 weight percent to about 12 weight percent ethylene glycol monobutyl ether, about 0.4 weight percent to about 8 weight percent triethanolamine;

about 0.1 weight percent to about 5 weight percent propylene glycol;

about 0.1 weight percent to about 5 weight percent triethylamine;

about 0.1 weight percent to about 10 weight percent kerosene; and about 0.1 weight percent to about 5 weight percent trimethylamine.

14. The method of claim 1, wherein the pH of the low pH oxidation bath is from about 0.0 to about 2.0.

15. The method of claim 1, wherein the pH of the low pH reduction bath is from about 2.0 to about 4.0.

16. The method of claim 1, wherein the predetermined temperature the surface is immersed in the low pH oxidation bath is from about 5 minutes to about 24 hours and the predetermined temperature of the low pH oxidation bath is from about 60° F. to about 150° F.

17. The method of claim 1, wherein the predetermined temperature the surface is immersed in the low pH reduction bath is from about 5 minutes to about 24 hours and the predetermined temperature of the low pH oxidation bath is from about 60° F. to about 150° F.

18. The method of claim 1, wherein the low pH oxidation bath further comprises:

about 1 weight percent to about 10 weight percent phosphate acid ester.

19. The method of claim 1, wherein the low pH oxidation bath further comprises:

about 0.5 weight percent to about 9.0 weight percent hydrogen peroxide.

20. The method of claim 1 wherein the low pH oxidation bath further comprises:

about 3 weight percent to about 10 weight percent sulfuric acid.

21. The method of claim 1, wherein the low pH reduction bath further comprises:

about 0.1 weight percent to about 5 weight percent EDTA.

22. The method of claim 1, wherein the low pH reduction bath comprises:

about 0.4 weight percent to about 10 weight percent sulfamic acid;

about 0.5 weight percent to about 10 weight percent ammonium bifluoride;

about 0.2 weight percent to about 6 weight percent hydrochloric acid;

about 0.1 weight percent to about 4 weight percent surfactant;

about 0.8 weight percent to about 14 weight percent sodium citrate;

about 0.1 weight percent to about 6 weight percent phosphate acid ester; and optionally, about 0.1 to about 2 weight percent d-limonine.

23. The method of claim 1, wherein the low pH reduction bath further comprises:

about 0.1 weight percent to about 5 weight percent EDTA.

24. The method of claim 1, wherein the low pH reduction bath comprises:

about 8 weight percent sulfamic acid;

about 8 weight percent ammonium bifluoride;

about 3 weight percent hydrochloric acid;

about 3 weight percent surfactant;

about 12 weight percent sodium citrate;

about 3 weight percent oxalic acid; and about 10 weight percent triethanolamine.

25. The method of claim 1 wherein the low pH reduction bath comprises:

less than about 1 weight percent formic acid;

about 0.4 weight percent to about 10 weight percent sulfamic acid;

about 0.4 weight percent to about 10 weight percent ammonium bifluoride;

about 0.1 weight percent to about 6 weight percent phosphate acid ester;

about 0.6 weight percent to about 15 weight percent citric acid;

about 0.1 weight percent to about 7 weight percent oxalic acid;

about 0.1 weight percent to about 5 weight percent glycolic acid;

about 0.1 weight percent to about 20 weight percent triethanolamine;

about 0.2 weight percent to about 6 weight percent hydrochloric acid;

about 0.1 weight percent to about 4 weight percent surfactant; and optionally, about 0.1 weight percent to about 5 weight percent d-limonine.

26. A method for removing contaminants from surfaces and the substrates of such surfaces, including porous surfaces, particulate surfaces, and surfaces with irregularities into which the contaminants may migrate or lodge, the method comprising:

immersing the surface in a low pH oxidation bath having a predetermined temperature and for a predetermined time, said low pH oxidation bath comprising about 2 weight percent to about 20 weight percent nitric acid, about 1 weight percent to about 10 weight percent phosphate acid ester; and immersing the surface in a low pH reduction bath having a predetermined temperature and for a predetermined time, said low pH reduction bath comprising about 0.4 weight percent to about 10 weight percent sulfamic acid, about 0.5 weight percent to about 10 weight percent ammonium biflouride, about 0.2 weight percent to about 6 weight percent hydrochloric acid, about 0.1 weight percent to about 4 weight percent surfactant, about 0.8 weight percent to about 14 weight percent sodium citrate, about 0.1 weight percent to about 6 weight percent phosphate acid ester, and optionally, about 0.1 to about 2 weight percent d-limonine.

27. A method for removing contaminants from surfaces and the substrates of such surfaces, including porous surfaces, particulate surfaces, and surfaces with irregularities into which the contaminants may migrate or lodge, the method comprising:

immersing the surface in a low pH oxidation bath having a predetermined temperature and for a predetermined time, said low pH oxidation bath comprising about 2 weight percent to about 20 weight percent nitric acid;

immersing the surface in a low pH reduction bath having a predetermined temperature and for a predetermined time, said low pH reduction bath comprising about 0.4 weight percent to about 10 weight percent of an acid able to extract cations from the contaminated surface, about 0.5 weight percent to about 10 weight percent of a composition that produces hydrofluoric acid in aqueous solution, about 0.1 weight percent to about 4 weight percent of a surfactant and about 0.8 weight percent to about 14 weight percent of a chelating agent able to fix soluble metals in the contaminants; and immersing the surface in a high pH extraction bath having a predetermined temperature and for a predetermined time, said high pH extraction bath comprising: about 0.5 weight percent to about 8 weight percent of a surfactant; about 0.4 weight percent to about 9 weight percent of a hydrocarbon emulsifier; about 0.1 weight percent to about 20 weight percent of a chelating agent for holding solubilized metal ions and particulates in suspension; about 0.5 weight percent to about 12 weight percent of a degreasing agent for removing hydrocarbons from the contaminated surface; about 0.3 weight percent to about 8 weight percent of a wetting agent; and about 0.3 weight percent to about 8 weight percent of a hydrotropic agent.

* * * * *

UNITED STATES PATENT AND TRADEMARK OFFICE
CERTIFICATE OF CORRECTION

PATENT NO. : 5,961,736
DATED : October 5, 1999
INVENTOR(S) : R.E. Borah et al.

It is certified that error appears in the above-identified patent and that said Letters Patent is hereby corrected as shown below:

| COLUMN | LINE | |
|---|---|---|
| 14 (Claim 11, | 47 line 2) | "temperature" should read --time-- |
| 15 (Claim 16, | 31 line 2) | "temperature" should read --time-- |

Signed and Sealed this

Seventeenth Day of October, 2000

Attest:

Q. TODD DICKINSON

*Attesting Officer*     *Director of Patents and Trademarks*